US008053723B2

(12) United States Patent
Senko

(10) Patent No.: US 8,053,723 B2
(45) Date of Patent: Nov. 8, 2011

(54) INTRASCAN DATA DEPENDENCY

(75) Inventor: Michael W. Senko, Sunnyvale, CA (US)

(73) Assignee: Thermo Finnigan LLC, San Jose, CA (US)

( * ) Notice: Subject to any disclaimer, the term of this patent is extended or adjusted under 35 U.S.C. 154(b) by 255 days.

(21) Appl. No.: 12/433,459

(22) Filed: Apr. 30, 2009

(65) Prior Publication Data

US 2010/0276586 A1 Nov. 4, 2010

(51) Int. Cl.
*G01N 21/31* (2006.01)
*H01J 49/00* (2006.01)

(52) U.S. Cl. .......................... 250/282; 250/281; 250/288

(58) Field of Classification Search .................. 250/281, 250/282, 284, 288

See application file for complete search history.

(56) References Cited

U.S. PATENT DOCUMENTS

| | | | | |
|---|---|---|---|---|
| 4,837,434 | A * | 6/1989 | James | 250/281 |
| 5,397,894 | A * | 3/1995 | Wells et al. | 250/282 |
| 5,420,425 | A * | 5/1995 | Bier et al. | 250/292 |
| 5,696,376 | A * | 12/1997 | Doroshenko et al. | 250/292 |
| 6,177,668 | B1 * | 1/2001 | Hager | 250/282 |
| 6,403,955 | B1 * | 6/2002 | Senko | 250/292 |
| 7,034,294 | B2 * | 4/2006 | Schwartz et al. | 250/292 |
| 7,157,698 | B2 * | 1/2007 | Makarov et al. | 250/281 |
| 7,238,936 | B2 * | 7/2007 | Okamura et al. | 250/284 |
| 7,312,441 | B2 * | 12/2007 | Land et al. | 250/282 |
| 7,381,947 | B2 * | 6/2008 | Senko | 250/292 |
| 7,495,485 | B2 * | 2/2009 | Holuigue et al. | 327/157 |
| 7,498,568 | B2 * | 3/2009 | Overney et al. | 250/282 |
| 7,511,267 | B2 * | 3/2009 | Zabrouskov | 250/282 |
| 7,582,865 | B2 * | 9/2009 | Schwartz et al. | 250/292 |
| 7,692,142 | B2 * | 4/2010 | Schwartz et al. | 250/290 |
| 7,804,065 | B2 * | 9/2010 | Remes et al. | 250/292 |
| 2002/0027195 | A1 | 3/2002 | Kato | |
| 2002/0121597 | A1 * | 9/2002 | Tanner et al. | 250/288 |
| 2006/0172429 | A1 | 8/2006 | Nilsson et al. | |
| 2008/0270083 | A1 * | 10/2008 | Lange et al. | 702/193 |
| 2008/0280317 | A1 | 11/2008 | Wu et al. | |
| 2009/0065686 | A1 | 3/2009 | Shilov et al. | |
| 2009/0302216 | A1 * | 12/2009 | Londry | 250/283 |
| 2010/0276583 | A1 * | 11/2010 | Senko | 250/282 |
| 2010/0276586 | A1 * | 11/2010 | Senko | 250/283 |

FOREIGN PATENT DOCUMENTS

| | | |
|---|---|---|
| WO | WO 2008/025014 A2 | 2/2008 |
| WO | WO 2008/110581 A2 | 9/2008 |

* cited by examiner

*Primary Examiner* — David A Vanore

(74) *Attorney, Agent, or Firm* — Michael C. Staggs

(57) ABSTRACT

A mass spectrometer data dependent method and apparatus is introduced to alter scanning parameters based upon data acquired during that scan. Such a method an apparatus may include the identification of ion species of interest meeting user specified criteria so that a determination can be made as to whether or not the present scan is to be continued, terminated, or alternatively paused while such a decision is being made. Such a method of operation saves overall cycle time and allows examination of, for example, marker ion ratios for additional peptides that might otherwise be missed.

11 Claims, 4 Drawing Sheets

| Scan Rate (amu/sec) | | | | |
|---|---|---|---|---|
| | Velos | LTQ | LXQ | Fleet |
| Turbo | 125000.00 | 125000.00 | 125000.00 | 80000.00 |
| Normal | 33333.33 | 16666.67 | 16666.67 | 12500.00 |
| Enhanced | 10000.00 | 5000.00 | 5000.00 | 5000.00 |
| Zoom | 2222.22 | 1111.11 | 1111.11 | 1111.11 |
| Ultrazoom | 27.78 | 27.78 | 27.78 | 27.78 |
| HM Turbo | 16666.67 | 16666.67 | 16666.67 | 16666.67 |
| HM Norm | 10000.00 | 2500.00 | 2500.00 | 2500.00 |
| HM Zoom | 555.56 | 138.89 | 138.89 | 138.89 |

FIG. 4A

| Scan Rate (ms/amu) | | | | |
|---|---|---|---|---|
| | Velos | LTQ | LXQ | Fleet |
| Turbo | 0.008 | 0.008 | 0.008 | 0.0125 |
| Normal | 0.03 | 0.06 | 0.06 | 0.08 |
| Enhanced | 0.1 | 0.2 | 0.2 | 0.2 |
| Zoom | 0.45 | 0.9 | 0.9 | 0.9 |
| Ultrazoom | 36 | 36 | 36 | 36 |
| HM Turbo | 0.06 | 0.06 | 0.06 | 0.06 |
| HM Norm | 0.1 | 0.4 | 0.4 | 0.4 |
| HM Zoom | 1.8 | 7.2 | 7.2 | 7.2 |

FIG. 4B

INTRASCAN DATA DEPENDENCY

BACKGROUND OF THE INVENTION

1. Field of the Invention

The present invention relates to the field of mass spectrometry, and more particularly to a mass spectrometer system and method that provides for one or more data dependent decisions to be made as to altering scan parameters based upon information acquired during the scan.

2. Discussion of the Related Art

Data dependent experiments currently involve collecting a mass spectral scan and then performing one or more subsequent scans based upon the analysis of data in the first scan. Generally described, data-dependent acquisition involves using data derived from an experimentally-acquired mass spectrum in an "on-the-fly" manner to direct the subsequent operation of a mass spectrometer; for example, a mass spectrometer may be switched between MS and MS/MS scan modes upon detection of an ion species of potential interest. Utilization of data-dependent acquisition methods in a mass spectrometer provides the ability to make automated, real-time decisions in order to maximize the useful information content of the acquired data. Current systems and methods that provide for real time data dependent functionality include, but are not limited to: the Data Dependent Experiment™ (DDE) tool utilized by Thermo Finnigan LLC of San Jose, Calif., the Data Directed Analysis (DDA) tool by Waters Corporation (Micromass™) and the Information Dependant Acquisition™ (IDA™) system marketed by MDS Sciex Inc. and Applera Corporation.

Data-dependent acquisition methods may be characterized as having one or more input criteria, and one or more output actions. The input criteria employed for conventional data-dependent methods are generally based on parameters such as intensity, intensity pattern, mass window, mass difference (neutral loss), mass-to-charge (m/z) inclusion and exclusion lists, and product ion mass. The input criteria are employed to select one or more ion species that satisfy the criteria. The selected ion species are then subjected to an output action (examples of which include performing MS/MS or MS" analysis and/or high-resolution scanning). In one instance of a typical data-dependent experiment, a group of ions are mass analyzed, and precursor ion species having mass spectral intensities exceeding a specified threshold are subsequently selected as precursor ions for MS/MS analysis, which may involve operations of isolation, dissociation of the precursor ions, and mass analysis of the product ions.

Generally, a mass spectrometer configured to provide such data dependent analysis most often includes: an ion source to transform introduced molecules in a sample into ionized fragments; an analyzer to separate such ionized ions by their masses by applying electric and magnetic fields; and a detector to measure and thus provide data for identifying and calculating the abundances of each ion fragment present. Moreover, such a mass spectrometer system often can and does include a two-dimensional (2D) and/or a three-dimensional (3D) ion trap that enables the storage of ions over a large range of masses for relatively large periods of time. Once the ions are formed and stored, various known techniques can be performed for isolating the desired ions of interest and for conducting MS/MS or $(MS)^n$ experiments. In particular, MS/MS often involves fragmentation of an ion or ions of interest in order to obtained desired information regarding the one or more ions' structure.

The fragmentation process itself typically includes the use of an auxiliary voltage of low amplitude (e.g., up to about 20 volts at a duration of up to about tens of milliseconds) configured with a resonance frequency to match desired ions frequencies of motion, which in turn is determined by the main trapping RF field amplitude and the ions mass-to-charge ratio (m/z). Particular ions in resonance with such an auxiliary applied voltage take up the energy and their amplitude of motion grows. In an ideal quadrupole field, the amplitude of resonating ions grows linearly with time if the resonance voltage is continuously applied. As the amplitude increases, the kinetic energy of resonating ions also increases (i.e., as the square of the amplitude) and thus any collisions that occur with introduced neutral gas molecules or other ions become increasingly energetic. Eventually, the collisions which occur deposit enough energy into the molecular bonds of the resonating ions to cause bonds to break and thus cause fragmentation. The beneficial result of such a method is a desired mass spectrum for analysis.

However, a constraint that has continued to limit mass spectrometer apparatus that utilize such 2D and 3D ion trap mass analyzer instruments is that upon initiating a scan of the contents of the traps, a completion of the initiated scan may be unwarranted based upon information that is obtained during scanning. In particular, there are no commercially available systems in place to direct such a system to automatically stop an MS, $(MS)^n$ or MS/MS scan in progress or continue such scans based on interrogated (m/z) data provided during the scan itself.

Background information on a data dependent system that alternates between a fast scan (i.e., measurement scan) and a slow scan (i.e., a survey scan) based on a pre-scan map, is described and claimed in U.S. Pat. No. 4,837,434, entitled, MASS SPECTROMETRY SYSTEM AND METHOD EMPLOYING MEASUREMENT/SURVEY SCAN STRATEGY," issued Jun. 6, 1989, to James, including the following, "A gas chromatography plus mass spectrometry system implements a scan strategy in which each full range scan alternates between a normal measurement mode and a survey mode based on a block/gap map made during the previous scan. Survey mode is used within regions that were determined in the previous scan to lack signal above a predetermined threshold. Spectral data is generated during measurement mode operation. Each scan serves both measurement and mapping functions in a way that avoids mass filter jumps, since each scan is monotonic over the entire scanning range."

Background information for a data dependent mass spectrometer system that enables peptidic analysis, is described and claimed in U.S. Pat. No. 7,498,568, entitled, "REAL-TIME ANALYSIS OF MASS SPECTROMETRY DATA FOR IDENTIFYING PEPTIDIC DATA OF INTEREST," filed Apr. 29, 2005, to Overney et al., including the following, "A mass spectrometry system is described. The mass spectrometry system comprises: (a) a mass spectrometer; and (b) a controller connected to the mass spectrometer. The controller is configured to: (i) direct the mass spectrometer to acquire a precursor ion spectrum of a sample stream; (ii) analyze, in real-time, the precursor ion spectrum to determine whether a first evaluation criterion is satisfied; (iii) if the first evaluation criterion is satisfied, direct the mass spectrometer to acquire a product ion spectrum of the sample stream; (iv) analyze, in real-time, the product ion spectrum to determine whether a second evaluation criterion is satisfied; and (v) if the second evaluation criterion is satisfied, analyze the product ion spectrum to assign an identification to the product ion spectrum. For certain implementations, the controller allows automated, data-dependent acquisition of mass spectrometry data to improve the efficiency at which peptidic data of interest can be acquired."

Background information for a data dependent mass spectrometer system that provides for selection of various dissociation techniques, is described and claimed in PCT application WO/2008/025014 A2, entitled, "DATA-DEPENDENT SELECTION OF DISSOCIATION TYPE IN A MASS SPECTROMETER," published filed Aug. 25, 2006, to Schwartz et al., including the following, "Methods and apparatus for data-dependent mass spectrometric MS/MS or MSn analysis are disclosed. The methods may include determination of the charge state of an ion species of interest, followed by automatic selection (e.g., CAD, ETD, or ETD followed by a non-dissociative charge reduction or collision activation) based at least partially on the determined charge state. The ion species of interest is then dissociated in accordance with the selected dissociation type, and an MS/MS or MSn spectrum of the resultant product ions may be acquired."

Accordingly, a need exists for a mass spectrometer system that utilizes a data dependent method of altering the acquisition of a given scan by monitoring for ion species of interest during the scan so as to determine whether to continue or terminate the present scan in order to preserve overall cycle time and improve efficiency. The present invention is thus directed to such a need.

SUMMARY OF THE INVENTION

Accordingly, the present invention provides for an intra-scan data dependent method to alter specific scan parameters within a mass spectrometer system during the scan. In particular, the present invention provides a method that includes: providing one or more ions in a trapping chamber, the trapping chamber being coupled to the mass spectrometer system; initiating a scan of the trapping chamber using one or more appropriate resolutions to identify one or more ion species of interest resulting from the one or more ions; determining if a user specified input criteria with respect to the ion species of interest requires the initiated scan to be terminated; alternatively continuing the initiated scan at one or more appropriate scanning resolutions based upon said user specified input criteria so as to provide a desired mass spectrum of the one or more ions in the trapping chamber and outputting to a user, the desired mass spectrum representative of the scanned one or more ions within the trapping chamber.

In accordance with another aspect of the present invention, the present invention provides for an automated data dependent spectrometer. In particular, the spectrometer includes an ion trapping chamber configured to receive one or more ions; a controller configured to initiate a mass spectrum scan of the one or more of ions within the ion trapping chamber, the controller additionally configured to identify one or more ion species of interest resulting from the initiated mass spectrum scan and based upon user specified input criteria, terminate the initiated mass spectrum scan but alternatively, continue with the initiated mass spectrum scan if the conditions set by the user specified input criteria requires such a result so as to provide for a desired mass (m/z) spectrum having one or more appropriate scan resolutions; and a mass spectrum recording and displaying means to indicate data resultant from the terminated scan or the provided desired mass (m/z) spectrum.

Accordingly, the present invention provides for an apparatus and method of operation that provides for a decision to be made as to altering the scan parameters (e.g., stopping or continuing with the present scan) based upon information acquired during the scan itself so as to save overall cycle time and allow examination of, for example, marker ion ratios for additional peptides that might otherwise be missed.

BRIEF DESCRIPTION OF THE DRAWINGS

FIGS. 4A-4B show example scan rate charts in (amu/sec) and (ms/amu) for example ion trap based instruments that can be utilized by the present invention.

DETAILED DESCRIPTION

Figure 1:
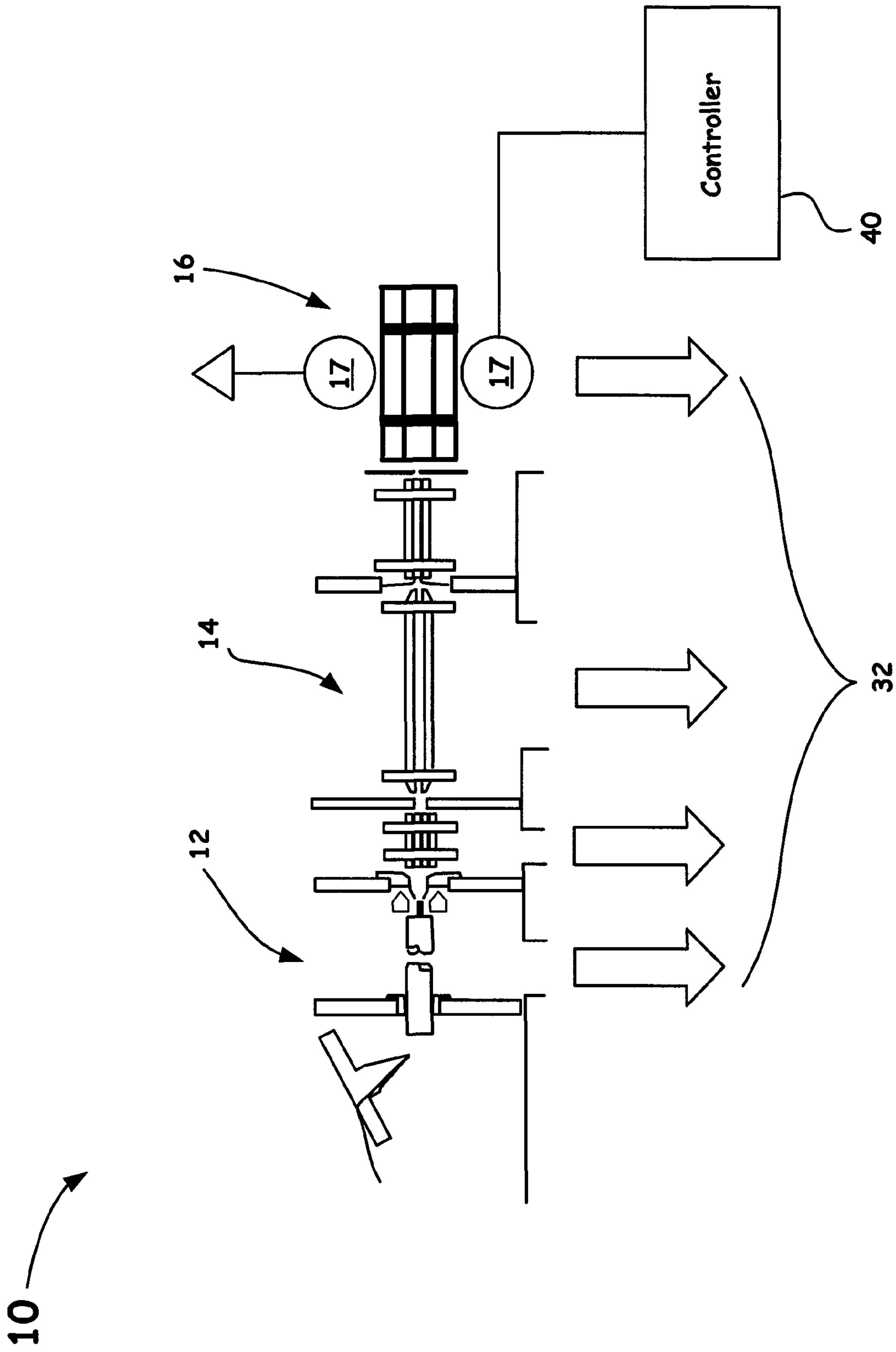
FIG. 1 shows an example mass spectrometer system of the present invention.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise.

In addition, unless otherwise indicated, numbers expressing quantities of ingredients, constituents, reaction conditions and so forth used in the specification and claims are to be understood as being modified by the term "about." Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

Data dependent instrument control programs and software applications are crucial to the usefulness with respect to mass spectrometer systems and in particular, with respect to ion traps configured within such systems. Since all of the scan functions for single and tandem mass analysis are a complicated sequence of timed events, computer control of the scan is both vital and an opportunity to provide unique instrument performance. The data dependent scan function for tandem mass analysis is an excellent example of what can be done to automate and efficiently acquire data to solve a complex problem such as peptide identification. Without data dependent scan control and application software to help analyze the data, problems such as, but not limited to, peptide identification are often too slow to be of any real utility.

The present invention, however, provides for an even faster and improved novel method for decreasing analytical analysis of an experimental run when such a run is simply not warranted. The basic concept includes an initiated scan to be implemented once one or more precursor or desired fragmented ions are contained in a trapping chamber (e.g., an ion trap). Thereafter, upon acquiring mass data, i.e., m/z data, from one or more regions of a mass range, a decision provided by, for example, a control and data system can be made as to whether to continue or terminate the scan based on user input specified criteria.

Specific Description

FIG. 1 shows a beneficial example configuration of a mass spectrometer instrument, shown generally designated by the reference numeral 10, which is capable of being utilized with the methods of the present invention. It is to be appreciated that mass spectrometer 10 is presented by way of a non-limiting beneficial example and thus the present invention may also be practiced in connection with other mass spectrometer systems having architectures and configurations different from those depicted herein. Moreover, while the spectrometer 10 of FIG. 1 is generally shown and described herein with reference to a two-dimensional (2D) linear ion trap 16 shown with coupled detectors 17 (e.g., an electron multiplier or other known means understood in the art), it is to be understood that the methods of the present invention can also be beneficially utilized in connection with three-dimensional (3D) ion traps (not shown). No matter what particular 2D or 3D ion trapping chamber means is utilized, such analyzing devices, which are capable of performing both mass analysis and dissociation functions within a common structure, are eventually scanned at different rates by any of the known methods known and understood by those of ordinary skill in the art so as to determine the contents of the trap. For example, scanning the contents can include the mass selective instability scan, as described in U.S. Pat. No. 4,540,884, or enhanced forms of the instability scan (e.g., resonance ejection), as described in U.S. Pat. No. 4,736,101, the disclosures of which are herein incorporated by reference in their entirety.

In addition, the ion traps of the present invention can also be combined with other beneficial features that are known in the industry, such as, but not limited to, Normalized Collision Energy, Stepped Normalized Collision Energy, as well as Automatic gain control (AGC). AGC in particular, includes first injecting ions into the ion trap for some predetermined time using some gating optical element, typically in a pre-scan. A measurement of the resultant signal in the pre-scan is taken, and a calculation is then performed to determine what injection time (i.e. how long the gate is open) is needed to yield a specified "target" amount of signal, the target being the optimum signal which avoids saturation or space charge effects in the trap. A useful technique that incorporates such an automatic ion supply control feature is described and claimed in U.S. Pat. No. 5,572,022, entitled "Method And Apparatus Of Increasing Dynamic Range And Sensitivity Of A Mass Spectrometer," issued Nov. 5, 1996, to Schwartz et al., the disclosure of which is incorporated be reference in its entirety.

With respect to the example linear trap device shown in FIG. 1, it is known to those of ordinary skill in the art that such a structure often comprises pairs of opposed elongated electrodes aligned across orthogonal X and Y dimensions. Ions are contained in a region within the interior by the application of RF trapping voltages to electrode pairs in combination with an applied axial DC field that collects ions in the interior portions of the ion trap. As part of the configuration, predetermined apertures enable expulsion of ions for subsequent detection. Although quadrupole arrangements are often beneficially utilized, other multipole configurations, such as, for example, hexapoles, octupoles, decapoles, etc., can also be utilized within a mass spectrometer system 10 that uses the methods of operation of the present invention.

Thus, as part of the mass spectrometer 10 system, as generally shown in FIG. 1, a sample containing one or more analytes of interest can be ionized via an ion source 12 using any of the applicable techniques known and understood by those of ordinary skill in the art. Such techniques can include, but are not strictly limited to, Electron Ionization (EI), Chemical Ionization (CI), Matrix-Assisted Laser Desorption Ionization (MALDI), Electrospray Ionization (ESI), Atmospheric Pressure Chemical Ionization (APCI), Nanoelectrospray Ionization (NanoESI), and Atmospheric Pressure Ionization (API), etc.

The resultant ions are directed via predetermined ion optics 14 that often can include tube lenses, skimmers, and multipoles selected from radio-frequency RF quadrupole and octopole ion guides, etc., so as to be urged through a series of chambers of progressively reduced pressure that operationally guide and focus such ions to provide good transmission efficiencies. The various chambers communicate with corresponding ports 32 (represented as arrows in the figure) that are coupled to a set of pumps (not shown) to maintain the pressures at the desired values. The operation of mass spectrometer 10 is controlled and data is acquired (e.g., by scanning the ion trap) and processed by a control and data system 40 (a controller) of various circuitry of a known type, which may be implemented as any one or a combination of general or special-purpose processors (digital signal processor (DSP)), firmware, software to provide instrument control and data analysis for mass spectrometers and/or related instruments, and hardware circuitry configured to execute a set of instructions that embody the prescribed data analysis and control routines of the present invention. Such processing of the data may also include averaging, scan grouping, deconvolution, library searches, data storage, and data reporting.

In addition, such instruction and control functions, as described above, can also be implemented by a mass spectrometer system 10, as shown in FIG. 1, as provided by a machine-readable medium (e.g., a computer readable medium). A computer-readable medium, in accordance with aspects of the present invention, refers to mediums known and understood by those of ordinary skill in the art, which have encoded information provided in a form that can be read (i.e., scanned/sensed) by a machine/computer and interpreted by the machine's/computer's hardware and/or software.

Thus, as mass spectral data of a given spectrum is received by a beneficial mass spectrometer 10 system, as disclosed herein, the information embedded in a computer program of the present invention can be utilized, for example, to extract data from the mass spectral data, which corresponds to a selected set of mass-to-charge ratios. In addition, the information embedded in a computer program of the present invention can be utilized to carry out methods for normalizing, shifting data, or extracting unwanted data from a raw file in a manner that is understood and desired by those of ordinary skill in the art.

As briefly discussed above, the invention disclosed herein provides for a novel and useful extension of a data-dependent mode of operation by being configured to alter the acquisition of a current scan based upon information (i.e., m/z data) that has been acquired during the scan. Thus, the present invention provides for an even faster and improved novel method for decreasing analytical analysis of an experimental run when such a run is simply not warranted.

In an example method of operation, a user defines the data dependent operation by specifying the measurement input criteria and resultant action criteria, e.g., dissociation type, m/z range, intensity threshold, charge state (e.g., +1, +2, +2–3, etc.), ion marker ratios, resolution, etc. As part of the decision making process, isobaric tagging methods, such as, but not limited to, Tandem Mass Tag (TMT) and/or iTRAQ reporter ions can often be incorporated with the methods of the present invention for qualification and quantitation of desired molecular species, e.g., peptides labeled with such tags. Thereafter, the selected peptide or protein precursor ions that may have such isobaric tags are often isolated and fragmented within the ion trap 16 device based upon desired input charge state criteria using any of the known processes selected solely or in combination, as understood by those skilled in the art. For example, dissociation processes can include, but are not strictly limited to, pulsed Q-dissociation (PQD), collision activation dissociation (CAD), infrared multi-photon photo-dissociation (IRMPD), electron transfer dissociation (ETD, described in U.S. Patent Publication No. US2005/0199804, the disclosure of which is incorporated herein), high energy C-trap dissociation (HCD), and/or collision-induced dissociation (CID). ETD in particular, is a beneficial technique when used in the present invention because it significantly improves protein characterization, post-translational modification (PTM) analysis and top-down or middle-down sequencing of proteins and peptides.

As an example when using isobaric tagging methods, one or more isobaric labeled peptides are contained in an ion trap and/or further fragmented using for example, tandem MS operations known to those skilled in the art. A scan can be initiated and after the low mass marker region is acquired (e.g., about the 126 m/z range up to about the 131 m/z range for TMT or about the 110 m/z range up to about the 117 m/z range for iTRAQ) a decision is made as to whether to continue with the present scan or possibly terminate. The decision can either be made as the scan continues, or alternatively, the scan can be paused while the decision is made. If the marker ion ratios meet user specified criteria, then the scan is directed to continue until completion so as to allow for identification of the molecules of the one or more molecules of interest, e.g., a desired peptide. To further demonstrate the capabilities disclosed herein, if ratios of 10:5:2:1 are recorded, this peptide is of interest and therefore it is deemed beneficial to collect data that enables identification. By contrast, if ratios, such as ratios substantially near 1:1:1:1 are recorded, the peptide is more often not of interest and thus, acquisition of a complete mass range in this example illustration is, depending on the input criteria, deemed unnecessary and thus the scan is often terminated. Such a method of operation saves overall cycle time and allows examination of marker ion ratios for additional peptides that might otherwise be missed.

Another beneficial aspect of the present invention can be found in the analysis of certain peptides of interest that are linked to post translation modification of proteins, such as, for example, glycosylation and sequences which have phosphorylated amino acid residues, e.g., phosphotyrosine, phosphoserine, or phosphothreonine. Phosphotyrosine, in particular, has been shown to be a primary mechanism of signal transduction during normal mitogenesis, cell cycle progression and oncogenic transformation and thus has drawn attention as to studying its presence and abundance in isolated proteins or peptide sequences. Thus, tandem mass spectroscopy techniques such as, but not limited to, LC/MS/MS coupled with beneficial dissociation methods that optimize the analysis of such modifications, e.g., electron transfer dissociation (ETD), can be beneficially used to identify and quantify such proteins and peptides with the generated sequence data capable of being searched in one or more sequence databases.

Moreover, similar to the TMT and iTRAQ tagging method discussed above, the identification of such desired protein fragments can also be isotopically labeled in a manner to enable discrimination of the mass data between desired protein samples. The present invention thus can expedite the analysis process of, for example, phosphorylated residues, in a data dependent manner by looking for such signals of scanned ions that indicate its presence and/or abundance and if certain set criteria is met, pausing or continuing on with the scan at one or more desired resolutions within desired m/z regions of a mass spectrum, but if not, terminating the scan so as to improve the overall efficiency of the data analysis.

As a particular example illustration as to how the present invention can be utilized in analyzing such proteins, specifically with respect to phosphotyrosine, it is to be noted that after collision activation is utilized to produce desired daughter ions, the phosphotyrosine peptides themselves normally form a characteristic fragment at about m/z 216. Thus, after m/z 216 is recorded, if it is below a user specified abundance, the remainder of the scan can be terminated because the peptide is not of interest and therefore identification is more often than not, deemed unnecessary.

As noted above, in those situations where implemented low mass reporter ions are potentially obscured or occluded based on the utilized fragmentation process, a system of the present invention can also be beneficially configured to operate using pulsed Q-dissociation (PQD), the technique of which is described in U.S. Pat. No. 6,949,743 B1 and of which is incorporated herein by reference in its entirety. Generally described, PQD is a technique that eliminates the low mass cut-off concern inherent with all ion traps. This results in extensive coverage for predicted and unpredicted metabolites, and the ability to perform peptide quantification using, for example, iTRAQ labels.

In particular, PQD involves putting one or more precursor ions contained in a trap at a high Q value between about 0.6 up to about 0.8 in conjunction with a short (e.g., about 100 μs in duration) high amplitude pulse to provide for resonance excitation of desired ions. The ions are held at the high Q for a short period of time (e.g., up to about 100 μs), which by design enables the kinetic energy of the ions at resonance to be converted into internal energy through collisions, but not long enough for significant dissociation to occur. Thereafter, the precursor ions' Q value is pulsed to a low value by dropping the RF amplitude and allowing such ions to undergo fragmentation at this low Q value. Such a method of activating at high Q values and collecting fragments at low Q values results in an information-rich mass spectrum. Thus, when using iTRAQ™ or TMT marker ions in conjunction with PQD, a broader mass spectrum that includes resultant low mass fragmented ions in addition to ions past the low mass marker region can be collected using the novel variable resolution scanning techniques of the present invention that are described herein.

Figure 2:
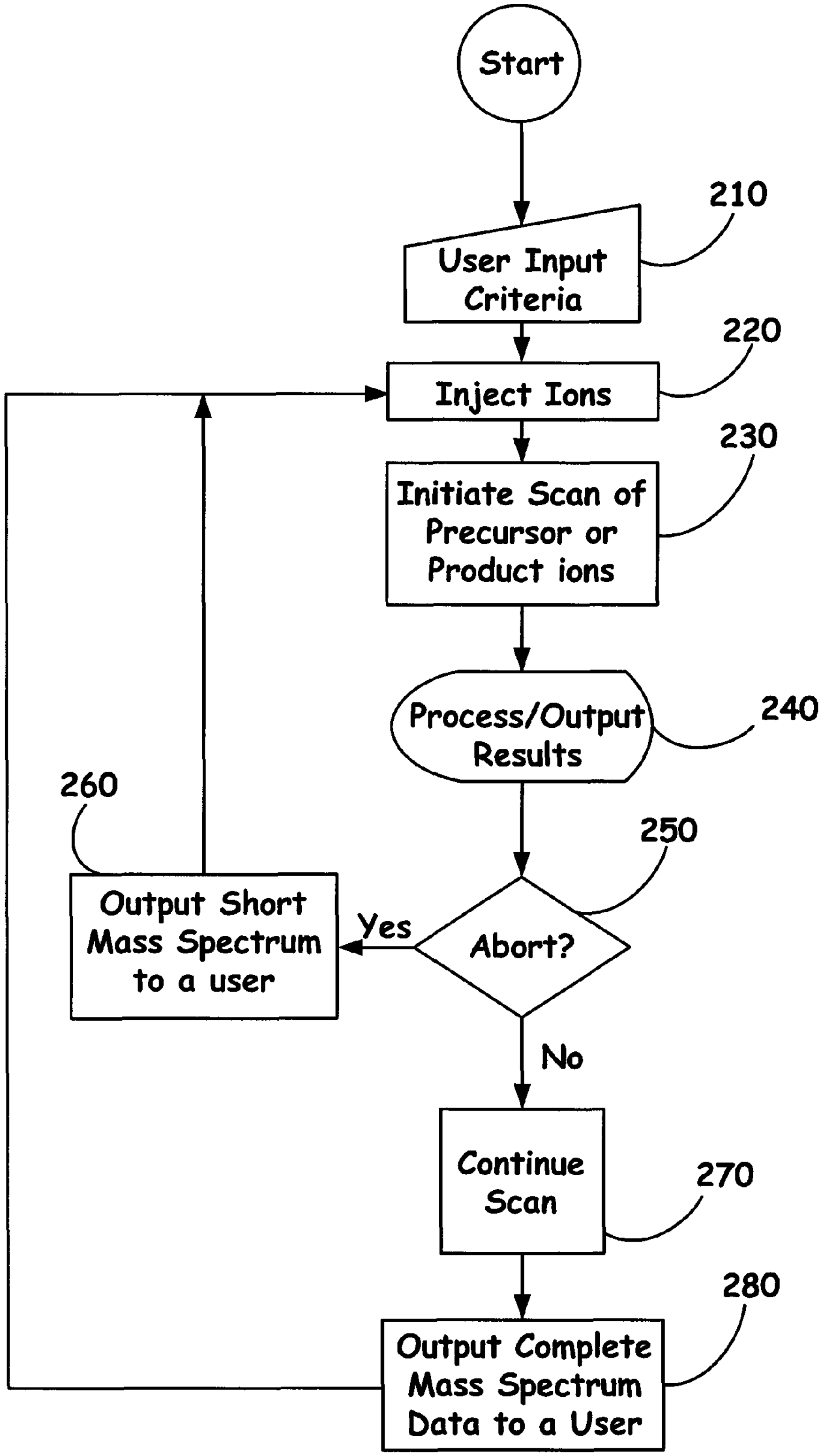
FIG. 2 shows a general flow-chart method of the present invention.

FIG. 2 shows a general flowchart for the data-dependent method of the present invention. As discussed above, the steps of such an example method can be implemented as a set of software instructions executed by a control and data system 40, as shown in FIG. 1, and/or as provided by a machine-readable medium. Thus, as an example step 210, user specified criteria is inputted into control system software, which can be beneficially automated, and can include a graphical user interface (GUI) configured from any customized progranunable language or specialized software programming environment to enable ease of operation when operating the mass spectrometer methods and systems of the present invention. In a next example step 220, ions are injected into the ion trap. In example step 230, a scan can be initiated on one or more ion species of interest, which can include precursor ions or one or more daughter ions that have undergone any single or combination of the fragmentation techniques discussed above. Such a step includes acquiring data from the mass spectrometer system 10, as shown in FIG. 1, by ejecting ions from an ion trap analyzer 16 to coupled detectors 17. It is to be appreciated that although the term "mass" analyzer, "mass" spectral, etc. are sometimes utilized herein, one of ordinary skill in the art understands that such acquired data represents mass-to-charge ratios (m/z's) of molecules under investigation, rather than in their molecular masses.

In example step 240, as control and data system 40, as shown in FIG. 1, is continually processing detected ion species information, a decision is made on the current scan based on user input criteria, as illustrated by decision block 250, as to whether to abort the scan, or continue. If it is chosen to abort, the interrupted mass spectrum can be output at step 260, and ions can be injected for the next scan by returning to step 220. If it is decided against aborting, the scan continues at step 270, the complete mass spectrum is output at step 280, and the process then returns to step 220.

Figure 3A:
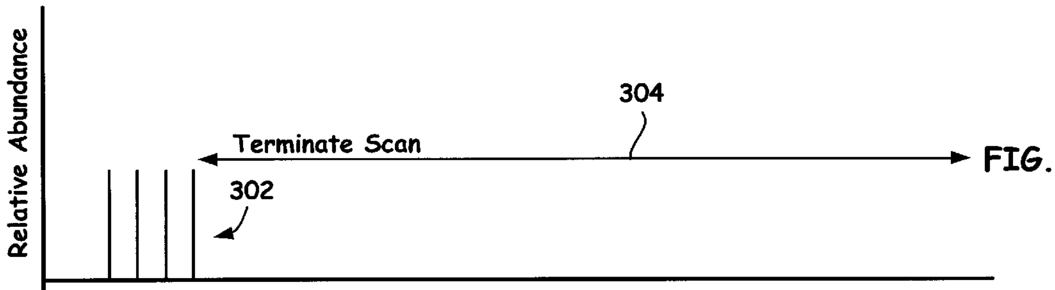
FIG. 3A shows a general plot of altering the scanning parameters during the scan of a system of the present invention ending in a termination of the scan.
Figure 3B:
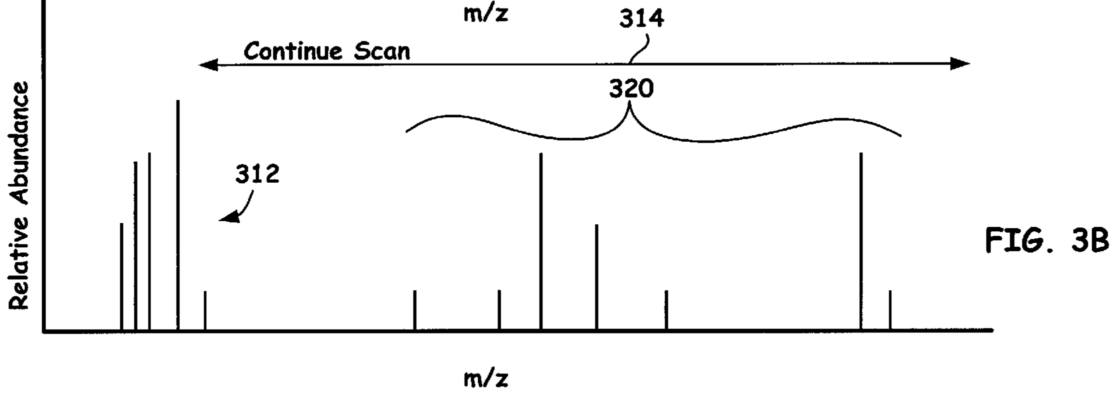
FIG. 3B shows a general plot of altering the scanning parameters during the scan of a system of the present invention by continuing the scan.

FIG. 3A and FIG. 3B shows general plots of example data that may be presented using the example method of operation as discussed above with respect to FIG. 2. In particular, FIG. 3A shows example low mass (m/z) data 302 scanned with an enhanced resolution that did not meet user specified input criteria (e.g., marker ion ratios did not meet criteria) and thus the scan is instructed to be terminated 304. By contrast, FIG. 3B shows example low mass (m/z) data 312 also scanned with an enhanced resolution that did meet user specified input criteria (e.g., marker ion ratios did meet criteria) and thus, mass spectral data 320 as shown in the remaining portion of the scan is capable of being produced, by instructing the mass spectrometer system 10, as shown in FIG. 1, to continue 314 with the scan.

FIG. 4A and FIG. 4B respectively show example scan rate charts in (amu/sec) and for the readers convenience (ms/amu) that are often utilized in the listed example ion trap based instruments provided by Thermo Fisher Scientific and of which can be incorporated with the methods and systems presented herein. Thus, to further illustrate the method of operation of the present invention, a discrete enhanced zoom rate for the LTQ of 1111.11 (amu/sec) may be preferably utilized based upon the user specified input criteria, as discussed above, so as to perhaps resolve, low mass reporter ions, e.g., as denoted by reference numeral 312, as discussed above and as shown in FIG. 3B. Once the desired m/z region is scanned, the system of the present invention may terminate the scan if in this example, the criteria established for such a region, (ratios, intensity, etc.) is not met but if such criteria meets the requirements input into the system, the scan can be continued 314, as shown in FIG. 3B using, for example, any of the predetermined illustrative scanning velocities that are exemplified in FIGS. 4A and 4B so as to provide for any appropriate resolution(s) in one or more m/z regions of a desired mass spectrum.

It is to be understood that features described with regard to the various embodiments herein may be mixed and matched in any combination without departing from the spirit and scope of the invention. Although different selected embodiments have been illustrated and described in detail, it is to be appreciated that they are exemplary, and that a variety of substitutions and alterations are possible without departing from the spirit and scope of the present invention.

The invention claimed is:

1. A data dependent method for altering scanning parameters of a mass spectrometer system during a scan, comprising:

providing one or more ions in a trapping chamber, said trapping chamber being coupled to said mass spectrometer system;

initiating a scan of said trapping chamber using an appropriate first scan resolution to identify one or more ion species of interest resulting from said one or more ions;

determining if a user specified input criteria with respect to said ion species of interest requires said initiated scan to be terminated;

alternatively continuing said initiated scan at one or more appropriate scanning resolutions based upon said user specified input criteria so as to provide a desired mass spectrum of said one or more ions in said trapping chamber; and outputting to a user, said desired mass spectrum representative of scanned said one or more ions within said trapping chamber.

2. The method of claim 1, wherein the step of initiating said scan comprises an enhanced resolution scan of the m/z range about said desired ion species of interest.

3. The method of claim 1, wherein said initiated scan continues while said determining step is being made.

4. The method of claim 1, wherein said initiated scan is paused while said determining step is being made.

5. The method of claim 1, wherein said appropriate first scan resolution and one or more appropriate scanning resolutions comprises scan rates ranging from about 125000.00 (amu/sec) down to about 27.78 (amu/sec).

6. The method of claim 1, wherein said one or more ion species of interest comprises one or more isobaric reporter ions in the low mass range from about 126 m/z up to about 131 m/z.

7. The method of claim 1, wherein said one or more ion species of interest comprises one or more isobaric reporter ions in the low mass range from about 110 m/z up to about 117 m/z.

8. The method of claim 1, wherein the ion species of interest has a phosphorylated amino acid residue.

9. The method of claim 8, wherein said phosphorylated amino acid residue comprises phosphotyrosine having a detected mass spectra at about m/z 216.

10. The method of claim 1, wherein said provided one or more ions are produced using at least one fragmentation process selected from: infrared multi-photon photo-dissociation (IRMPD), electron transfer dissociation (ETD), Pulsed Q dissociation (PQD), collision-induced dissociation (CID), collision activation dissociation (CAD), and high energy C-trap dissociation (HCD).

11. The method of claim 1, wherein said user specified input criteria comprises at least one criterion selected from: charge state, m/z range, intensity threshold, and ion ratios.

* * * * *